June 18, 1957 K. B. BRELAND 2,796,045
ANIMAL OPERATION AND REWARD DEMONSTRATION APPARATUS
Filed June 7, 1955 2 Sheets-Sheet 1

INVENTOR.
KELLER BRELAND,
BY
ATTORNEY.

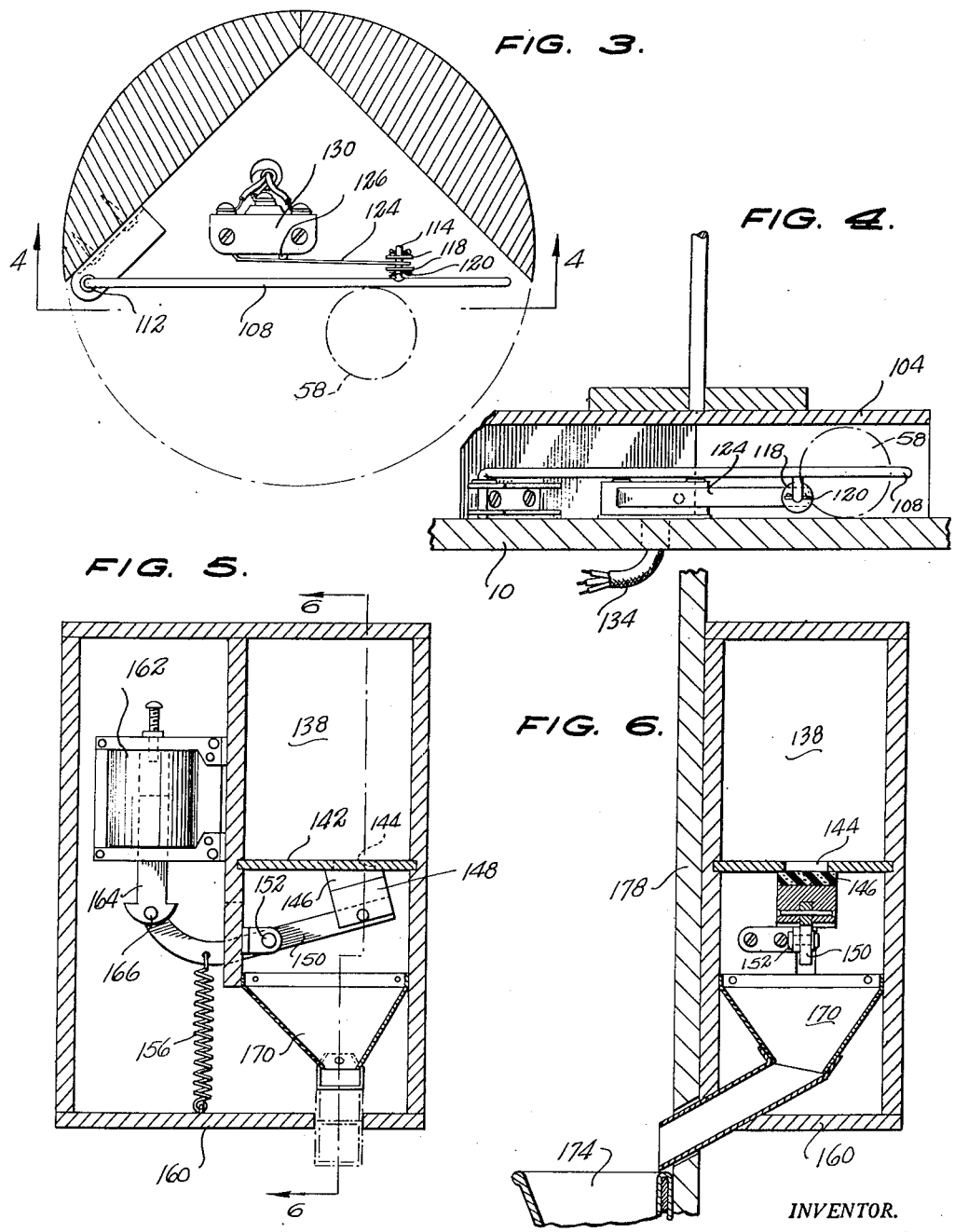

United States Patent Office 2,796,045
Patented June 18, 1957

2,796,045

ANIMAL OPERATION AND REWARD DEMONSTRATION APPARATUS

Keller B. Breland, Hot Springs, Ark.

Application June 7, 1955, Serial No. 513,786

11 Claims. (Cl. 119—29)

This invention relates to animal training devices and more particularly to a demonstration device for showing the degree of training that a chicken can undergo under certain circumstances.

It is commonly understood that the chicken is of a very low order of intelligence and instances where chickens have actually been trained to perform a predetermined cycle of activity are rare. However, the apparatus disclosed herein has been successful in that a chicken can be successfully trained to go through a series of movements of a predetermined sequence for the purpose of achieving a reward in the form of a feed.

The invention contemplates the use of a platform on which a chicken is taught to perch prior to jumping therefrom to a lower platform. When the chicken strikes the lower platform an element such as a golf club is actuated which in turn strikes a ball that rolls into engagement with a microswitch, thereby triggering a solenoid operated feed box.

It has been found possible, with such an apparatus, to train almost any chicken to perform in a psychologically interesting manner and wherein such performance affords considerable amusement at public gatherings, fairs and the like.

Accordingly, it is an object of the invention to provide a training and demonstrating apparatus which will be simple and economical to construct and which can be used for purposes of academic study as well as for public amusement.

It is a further object of my invention to provide an apparatus which is in no sense harmful to any chicken being trained, or going through a demonstration, nor in any way dependent upon causing pain to the bird, or fear.

A detailed description of the invention now follows in conjunction with the appended drawing, in which:

Fig. 3 is a plan section of a switch triggered by a golf ball propelled during the course of demonstration.

Fig. 4 is a section through 4—4 of Fig. 3.

Fig. 5 is a front vertical section through a solenoid operated feed device, and

Fig. 6 is a side section through 6—6 of Fig. 5.

Figure 1:
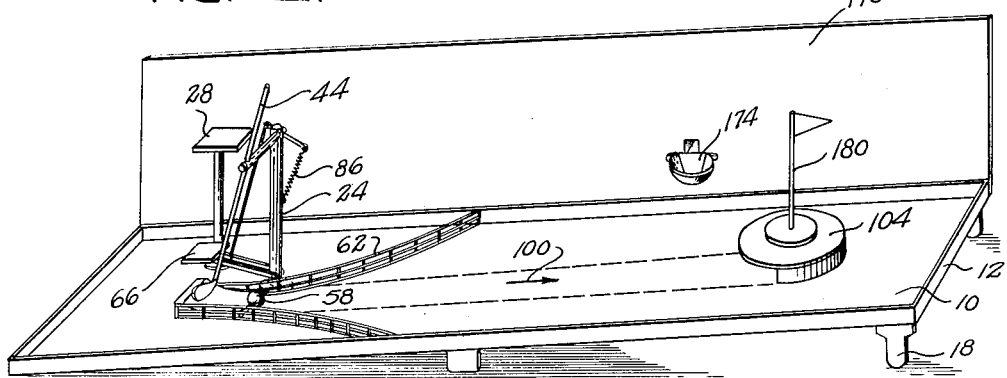
Fig. 1 is a perspective of the complete apparatus.
Figure 2:
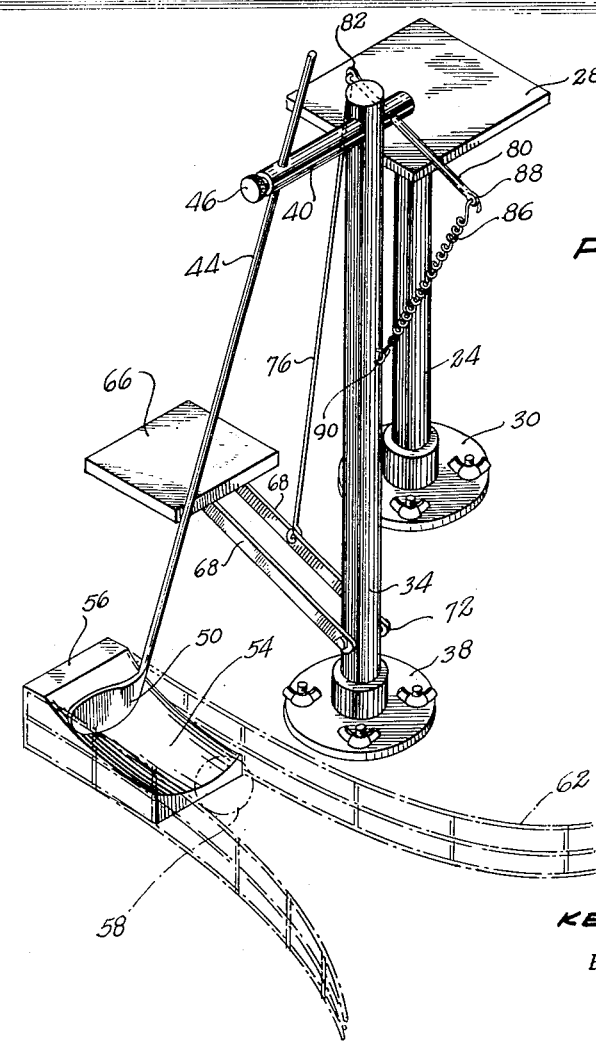
Fig. 2 is a magnified portion of the mechanically operated elements actuated by the weight of a falling chicken.

Referring now to Figs. 1 and 2, the invention comprises a platform 10 having a surrounding edge 12 and provided at one end with legs 18 so that the right hand end of the platform is slightly elevated or tilted with respect to the horizon. Carried by the platform at the left side thereof is a post 24 having a perch 28. The post is fastened to the platform in a conventional manner as by a flange element 30 secured by wing nuts for knock-down assembly. A second post 34 is similarly fastened to the platform by a flange element 38 and a pivotal bar 40 is carried at the top of post 34, the bar 40 being understood to have a free rotative fit within a suitably provided bore in the post 34.

The bar 40 carries a striker element such as golf club 44 of suitable relative size and weight and being secured in the bar as by a set screw 46. The head 50 of the golf club is disposed slightly above the concave surface 54 of a block 56. The surface 54 is suitably curved so as to conform to the rounded bottom of the golf club head, thereby protecting the head from unintended striking of objects other than the golf ball 58 shown in phantom. For further protection, and to maintain the motion of the ball in proper general direction, a miniature rail fence 62 is provided.

Carried by the post 34 is a movable platform 66 secured to a pair of beams 68 freely pivoted at 72 to post 34. The platform 66 and beams 68 may be rigidly attached to each other. Accordingly, it will be understood that arcuate motion of platform 66 in a vertical plane is possible. One of the beams 68 has a tension rod 76 hooked thereto which rod rises into a hooking engagement with an operating lever 80 at 82. The operating lever 80 is fastened within the bar 40 and extends therefrom, being provided with a tension spring 86 having an end fastened to the lever at 88 and another end fastened to post 34 at 90.

From the description thus given, it will be apparent that platform 66 is maintained in a raised position by tension of the spring 86. It will be further apparent that any weight, for example, the weight of a chicken on platform 28, jumping from said platform so as to land on platform 66, will effect a downward motion of that platform whereby tension through rod 76 will effect rotation counter-clockwise as viewed on Fig. 2 of lever 80 against spring 86, causing rotation of bar 40 which effects swinging of the club 44. Accordingly, a golf ball placed as shown in Fig. 2 would normally be struck and would roll up the inclined base 10, taking the general path as indicated by arrow 100 (Fig. 1).

If the blow struck by the club is reasonably forceful, the ball will travel up the inclined base and engage a microswitch within the housing 104.

Thus, by referring to Fig. 3, the ball 58 is shown as coming into engagement with a lever 108 pivoted at 112 within the housing. Lever 108 carries a pin 114 sandwiched between a pair of discs 118 held in place by cotter pins 120. A flexible blade 124 has a suitable bore surrounding pin 114 and the blade 124 is engageable with a pin 126 of a conventional microswitch 130. It will be apparent that inward movement of the lever 108 will flex the blade 124 so as to reciprocate pin 126 to close the switch. The construction is very simple and will be readily understood from Figs. 3 and 4.

The switch has a cable 134 hooked up in a conventional manner (not shown) to the solenoid operated feed device shown in Figs. 5 and 6. This feed device comprises a hopper 138 for holding a quantity of food pellets, which hopper has a bottom panel 142 having a bore 144 closed by a piece of foam rubber 146, carried by a wood block 148 which block is in turn carried on the end of a pivotal arm 150, arm 150 being pivoted in a bracket 152, and is maintained in feed shut-off position by means of a spring 156 secured between the arm 150 and a suitable housing 160 which comprises the feed-box device. A solenoid 162 of conventional construction having a plunger 164 is pivotally connected at 166 to the arm 150 and it will be understood that when the switch 130 is triggered, an electrical pulse to the solenoid serves to pull plunger 164 upwardly, thus opening the port 144 to momentarily permit flow of food pellets into a funnel 170 which conducts the pellets into a feed trough 174.

Preferably the feed device is in the form of a box as shown in Figs. 5 and 6, mounted at the rear of a panel 178 (Fig. 1), fastened to the rear edge of base 10. In order to give the effect of shooting for a hole in the golf course, a flag 180 may be perched at the top of the housing 104.

It will be apparent from the foregoing that the apparatus is entirely automatic in action; thus, a chicken learns to jump to perch 28 and then down to perch 66. Perch 66 is thus caused to deflect rapidly which swings the golf club so as to hit the ball 58 toward the switch. When the switch is struck, several pellets of food pour out into the trough 174. Accordingly, the chicken is rewarded by eating the food which he soon learns is in the trough.

The above apparatus has been found to be extremely successful in operation and one which affords considerable amusement to onlookers. Further, while the above description is of but one mode of carrying out the construction, we are aware that various changes may be made without departing from the spirit thereof. Accordingly, we do not seek to be limited to the precise illustration as herein given, except as set forth in the following claims.

I claim:

1. In a device of the class described, the combination comprising an elevated stationary platform, a relatively lower, movable platform, actuatable by an animal jumping from said elevated platform to said lower movable platform, a striker element operably connected to said latter platform, actuated by motion of said movable platform.

2. A device as set forth in claim 1, including a free body to be struck and propelled by said striker element, including a feed dispensing system arranged to dispense a charge of feed in response to motion of said free body.

3. A device as set forth in claim 1, including a free body to be struck and propelled by said striker element, and means comprising an electric switch disposed to be engaged by said free body after a predetermined degree of travel thereof, including an electrical feed dispensing device controlled by said switch so as to dispense a predetermined quantity of feed when energized by closing of said switch.

4. A device as set forth in claim 1, including a free body to be struck and propelled by said striker element, said striker element comprising a golf club and said free body comprising a golf ball engageable by said club.

5. In a device of the class described, the combination comprising an elevated stationary platform, a relatively lower, movable platform, actuatable by an animal jumping from said elevated platform to said lower movable platform, a striker element operably connected to said latter platform a golf ball disposed adjacent to and engageable by said striker element to be driven thereby, means comprising an electric switch disposed to be engaged by said golf ball after a predetermined degree of travel thereof, including an electrical feed dispensing device controlled by said switch so as to dispense a predetermined quantity of feed when energized by closing of said switch.

6. In a device as set forth in claim 1, including a base panel, a pair of posts secured to said base panel, said stationary platform being carried by one of said posts and said movable platform being carried by the other of said posts and pivoted thereto so as to be rockable on a horizontal axis, said striker element being pivotally carried by said second post, and linkage means intermediate said movable platform and said striker element for actuating said striker element by motion of said movable platform.

7. In a device as set forth in claim 6, said striker element comprising a golf club.

8. In a device as set forth in claim 7 including a base panel, said posts being secured to said panel so as to extend upwardly thereabove, said panel being disposed at a predetermined tilt, said golf club having a head disposed for swinging in an arc adjacent said base panel for engaging a golf ball.

9. A device as set forth in claim 8, including an electric switch disposed adjacent the higher end of said base panel whereby a ball struck by said club can travel across said base panel and strike said switch so as to close contact thereof, and a solenoid operated feed device disposed adjacent said base panel and triggered by closing of said switch so as to dispense a quantity of food pellets when energized.

10. In a device as set forth in claim 9, including a vertical rear panel secured to said base panel along one edge thereof, said solenoid-operated feeding device having a feed trough exposed at the front face of said rear panel and having a feed box and solenoid compartment disposed at the rear face side of said side panel.

11. In a device of the class described, the combination comprising an elevated stationary platform, a relatively lower, pivotal platform, actuatable by an animal jumping from said elevated platform to said lower pivotal platform, a movable striker element operably connected to said latter platform.

References Cited in the file of this patent

UNITED STATES PATENTS

| | | |
|---|---|---|
| 675,456 | Voorhees | June 4, 1901 |
| 1,759,352 | Hart | May 20, 1930 |
| 2,699,755 | Howell | Jan. 18, 1955 |
| 2,701,548 | Wolfe | Feb. 8, 1955 |

FOREIGN PATENTS

| | | |
|---|---|---|
| 250,875 | Great Britain | Apr. 22, 1926 |
| 292,092 | Great Britain | Dec. 27, 1928 |